United States Patent
Tagra

(10) Patent No.: US 12,475,022 B1
(45) Date of Patent: Nov. 18, 2025

(54) ROBUST METHODS FOR AUTOMATIC DISCRIMINATION OF ANOMALOUS SIGNAL PROPAGATION FOR RUNTIME SERVICES

(71) Applicant: Citibank, N.A., New York, NY (US)

(72) Inventor: Ankur Tagra, Mississauga (CA)

(73) Assignee: CITIBANK, N.A., NY (US)

( * ) Notice: Subject to any disclaimer, the term of this patent is extended or adjusted under 35 U.S.C. 154(b) by 0 days.

(21) Appl. No.: 19/052,264

(22) Filed: Feb. 12, 2025

(51) Int. Cl.
 G06F 9/44 (2018.01)
 G06F 11/32 (2006.01)
 G06F 11/3604 (2025.01)

(52) U.S. Cl.
 CPC ........ G06F 11/3612 (2013.01); G06F 11/327 (2013.01); G06F 2201/81 (2013.01)

(58) Field of Classification Search
 CPC . G06F 11/3612; G06F 11/327; G06F 2201/81
 See application file for complete search history.

(56) References Cited

U.S. PATENT DOCUMENTS

| | | | |
|---|---|---|---|
| 7,203,635 B2 | 4/2007 | Oliver et al. | |
| 7,430,505 B1 | 9/2008 | Horvitz et al. | |
| 7,480,640 B1 | 1/2009 | Elad et al. | |
| 7,519,529 B1 | 4/2009 | Horvitz | |
| 7,752,152 B2 | 7/2010 | Paek et al. | |
| 9,411,917 B2 | 8/2016 | Gil et al. | |
| 10,261,851 B2 | 4/2019 | Velipasaoglu et al. | |
| 10,460,235 B1 | 10/2019 | Truong et al. | |
| 10,740,694 B2 | 8/2020 | Harvill et al. | |
| 11,474,978 B2 | 10/2022 | Walters et al. | |
| 11,514,289 B1 | 11/2022 | Otte et al. | |
| 11,954,610 B2 | 4/2024 | Hong et al. | |
| 12,106,078 B2 | 10/2024 | Hughes et al. | |
| 2004/0249776 A1 | 12/2004 | Horvitz et al. | |
| 2010/0145902 A1 | 6/2010 | Boyan et al. | |
| 2011/0307228 A1 | 12/2011 | Kasabov | |

(Continued)

FOREIGN PATENT DOCUMENTS

| | | |
|---|---|---|
| CN | 111095308 A | 5/2020 |
| CN | 109032829 B | 12/2020 |

(Continued)

*Primary Examiner* — Hang Pan
(74) *Attorney, Agent, or Firm* — Perkins Coie LLP

(57) ABSTRACT

Systems and methods are disclosed comprising instructions to receive a captured sequence of data samples for updating a runtime statistical inference model, determine a first and a second sample distribution of data samples from the captured sequence using a reference position, generate a feature divergence score representative of deviations in input feature patterns for data samples between the first and the second sample distributions, determine a set of feature alignment scores representative of similarities between the set of input features and the set of output features for the data samples, select a set of anomalous data samples from the captured sequence of data samples using the set of feature alignment scores, identify a subset of critical input features from the selected set of anomalous data samples, and transmit a notification alert indicating maintenance review of the identified subset of critical input features associated with the statistical inference model.

20 Claims, 9 Drawing Sheets

(56) References Cited

U.S. PATENT DOCUMENTS

| | | |
|---|---|---|
| 2019/0206424 A1 | 7/2019 | Feast et al. |
| 2020/0387818 A1 | 12/2020 | Chan et al. |
| 2021/0081804 A1 | 3/2021 | Stojevic et al. |
| 2021/0133087 A1* | 5/2021 | Sundararaman .... G06F 11/3698 |
| 2021/0174958 A1 | 6/2021 | Drake et al. |
| 2021/0201112 A1* | 7/2021 | Gauthier Melançon ..................... G06V 10/40 |
| 2021/0233615 A1 | 7/2021 | Banavar et al. |
| 2023/0119939 A1* | 4/2023 | Agmon ................... G06F 21/32 726/18 |
| 2023/0162858 A1 | 5/2023 | Banavar et al. |
| 2023/0222311 A1 | 7/2023 | Otte et al. |
| 2023/0222314 A1 | 7/2023 | Alford |
| 2023/0248998 A1 | 8/2023 | Natarajan et al. |
| 2023/0368051 A1* | 11/2023 | Hu ........................... G06N 5/01 |
| 2023/0385378 A1 | 11/2023 | Yin |
| 2024/0028019 A1* | 1/2024 | Thiruvenkatanathan ..................... G05B 23/0221 |
| 2024/0054388 A1 | 2/2024 | Acharya et al. |
| 2024/0144489 A1 | 5/2024 | Nguyen et al. |
| 2024/0202405 A1 | 6/2024 | Lang et al. |

FOREIGN PATENT DOCUMENTS

| | | |
|---|---|---|
| CN | 112154508 A | 12/2020 |
| CN | 112349393 A | 2/2021 |
| CN | 113449048 B | 11/2021 |
| CN | 117725448 A | 3/2024 |
| CN | 118749032 A | 10/2024 |
| CN | 118783396 A | 10/2024 |
| EP | 3625677 A1 | 3/2020 |
| EP | 3516583 B1 | 3/2023 |
| KR | 20160143512 A | 12/2016 |
| KR | 102128056 B1 | 6/2020 |
| KR | 20200143462 A | 12/2020 |
| KR | 20220093845 A | 7/2022 |
| WO | 2017048730 A1 | 3/2017 |
| WO | 2018146492 A1 | 8/2018 |
| WO | 2018213205 A1 | 11/2018 |
| WO | 2020247204 A1 | 12/2020 |
| WO | 2021195604 A2 | 9/2021 |
| WO | 2024192445 A1 | 9/2024 |
| WO | 2024201036 A1 | 10/2024 |

* cited by examiner

US 12,475,022 B1

ROBUST METHODS FOR AUTOMATIC DISCRIMINATION OF ANOMALOUS SIGNAL PROPAGATION FOR RUNTIME SERVICES

BACKGROUND

In the fields of predictive analytics, data science, and machine learning, the phenomenon known as concept drift, or simply drift, refers to the evolution of data over time that renders a data model invalid/inaccurate. A fundamental aspect of a data model in machine learning is its reliance on the statistical properties of the data, such as the underlying relationships between input data and target variables. When these properties deviate from those of the training dataset, the predictions generated by the model may become invalid if the concept drift is not addressed. The impact of concept drift can be profound, leading to incorrect predictions, reduced model effectiveness, and potentially significant business or operational consequences if not properly managed.

Data drift may occur when database records no longer align with real-world data due to changes over time. This issue is particularly prevalent in databases that involve human data, such as those containing information about customers, employees, citizens, or residents. Human related data drift can result from unrecorded changes in personal information, such as changes in residence or name, as well as from errors during data entry. Further, data drift can refer to inconsistencies in data elements across multiple replicas of a database, which can further complicate data management and analysis. The impact of data drift includes degraded data quality, increased error rates, and the potential for significant disruptions in data-driven decision-making processes. Together, data drift and concept drift pose substantial challenges to maintaining the accuracy and reliability of machine learning models and predictive systems.

BRIEF DESCRIPTION OF THE DRAWINGS

Detailed descriptions of implementations of the present invention will be described and explained through the use of the accompanying drawings.

Figure 1:
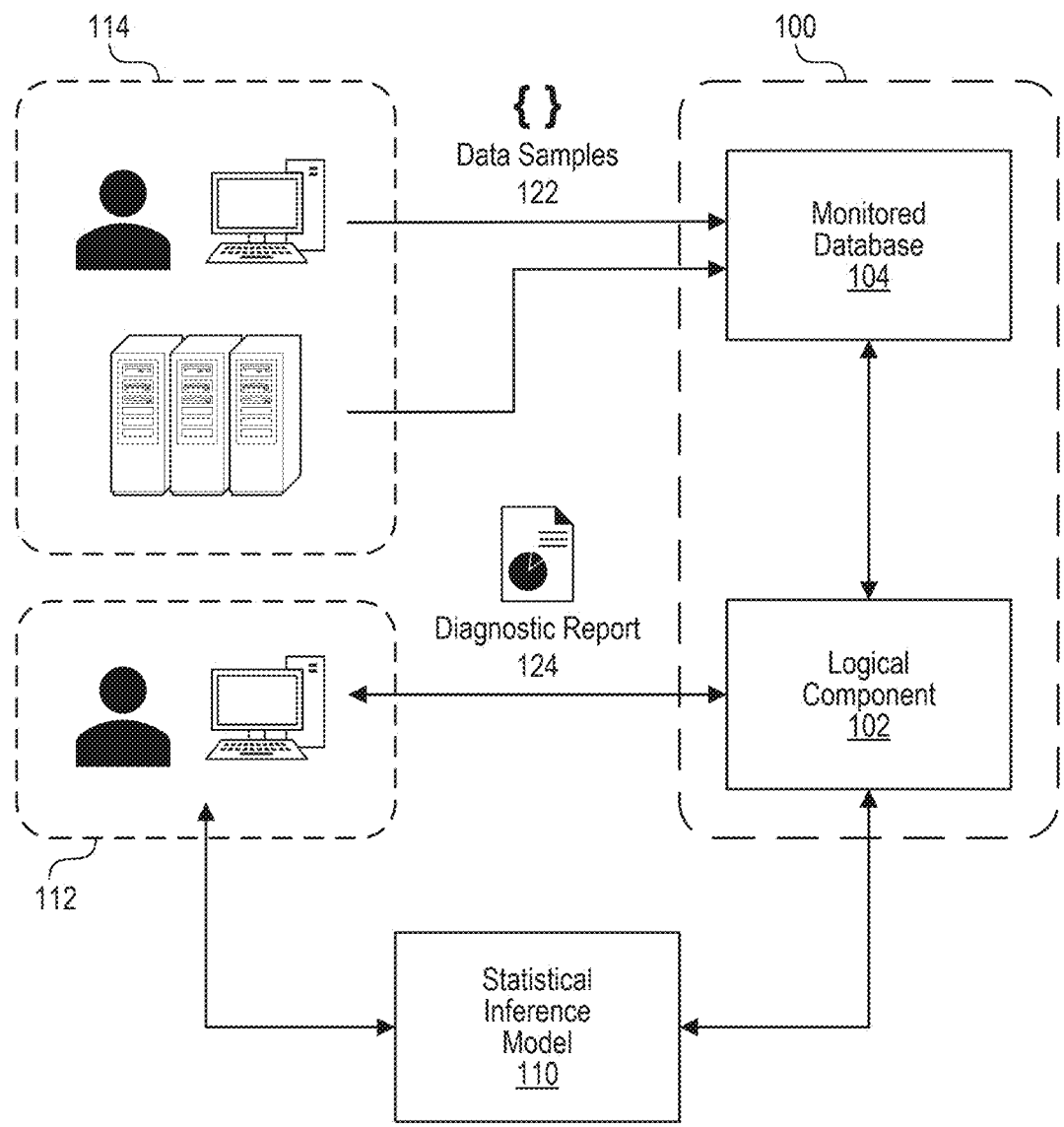
FIG. 1 is a block diagram showing an illustration of a model diagnostics system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Existing performance management systems for live deployment (e.g., real-time services) of AI algorithms (e.g., machine learning models) typically perform periodic updates to predictive models (e.g., retraining, finetuning, and/or the like) using new reference data samples to mitigate performance degradation (e.g., increased inaccuracy rate, precision errors, and/or the like) caused by natural variations of input data distributions (e.g., data drift, concept drift) and to maintain quality of prediction outputs (e.g., at a performance threshold) over time. With increasing popularity of larger inference models (e.g., large language models, deep learning networks, and/or the like) within contemporary computing systems (e.g., live enterprise services, remote-hosted data centers, and/or the like), conventional systems require proportionately large quantities of new reference data to maintain similar model output performance. To validate content quality of new reference data, existing systems often perform manual, and/or semi-automated, analysis techniques (e.g., feedback obtained via client-side reviews) for verifying representative accuracy (e.g., expected values of observed parameters, sufficient breadth of evaluation scenarios, ground truth labels and/or the like) of sample input and output features. However, as data requirements of large inference models continue to grow, manual techniques for validating new reference data become increasingly intractable.

One of the challenges to creating a system to mitigate data drifts requires addressing several unknowns in conventional approaches of maintaining performance quality of statistical inference models, such as how to detect propagation of anomalous data properties within reference data used to update the model. Automated solutions (e.g., executable software programs) for validating reference data samples are often limited to verifying data compatibility of input and output parameters (e.g., matching variable types) within a given model, which typically lacks necessary analytical complexity and/or nuance to evaluate content fitness (e.g., deviations in input feature patterns) of new reference data for updating models. To further compound the issue, conventional systems for real-time service models often struggle to properly identify anomalous properties (e.g., non-representative data characteristics, inaccessible input information, and/or the like) within reference datasets (e.g., for updating the deployed model) prior to observing direct performance degradation. As a result, these systems typically default to using retroactive solutions after significant damages have already been incurred (e.g., compromised inference models, diminished client-facing user experience, undue burden on maintenance support teams, negative impacts on service providers and third-parties, and/or the like).

Thus, there is an evident need for an automated solution that enables proactive identification of anomalous properties in reference datasets to uphold stable performance of statistical inference models.

To overcome these and other technological uncertainties with conventional systems, the inventors systematically evaluated multiple design alternatives. For example, the inventors tested various machine learning algorithms and integrative system designs to determine which would be most effective for early detection of anomalous data properties found in reference data samples. The inventors experimented with measuring divergence patterns (e.g., shift in data distributions) between a set of data sample distributions (e.g., via Kolmogorov-Smirnov score) of model reference datasets. Determination of these data divergence patterns allowed the inventors to configure machine learning models with sufficient precision to identify specific characteristics (e.g., covariate feature correlations) associated with propagating anomalous properties within reference datasets used to update the statistical inference model.

However, restricting analysis of reference datasets to measuring divergence patterns proved to be inadequate for capturing the critical data features (e.g., high covariate input features) of the statistical inference model that correlated with the observed anomalous data properties. Thus, the inventors experimented with different methods for identifying critical data features corresponding to the determined anomalous data properties. For example, the inventors evaluated different methods of identifying anomalous inference data samples that demonstrate high content similarities (e.g., via cross-feature correlation) between input and output reference data parameters, indicating presence of irrelevant and/or inaccessible input information (e.g., leakage of training data) within the reference dataset. As a result, the inventors implemented an automated feature analysis process that enables users (e.g., authorized maintenance personnel) to efficiently locate and resolve subtle issues pertaining to reference (e.g., training) data of a statistical inference model prior to realized performance issues.

Disclosed herein are systems and related methods for detecting and mitigating performance risks associated with reference datasets for updating runtime statistical inference models (e.g., machine learning models, generative artificial intelligence, and/or the like). The disclosed system detects propagation of anomalous signals and/or properties found in reference data samples (e.g., pair of input and output features) via cross-feature analysis (e.g., comparison of input and/or output components) of select sample distributions (e.g., subsets of reference dataset samples). In an example, the disclosed system identifies (e.g., in real-time) one or more anomalous data samples from inflowing datasets for updating the runtime statistical models. Accordingly, the disclosed system extracts critical data features from the identified anomalous data samples (e.g., contributing factors and/or variables to identified anomalous signals). By discriminating critical input features associated with the anomalous properties from the inflowing sequence of datasets, the disclosed system enables subscribed users (e.g., an authorized maintenance user) to proactively (e.g., in real-time) identify and/or resolve issues found within reference datasets for updating statistical inference models prior to downstream model performance issues. The disclosed system enhances external visibility (e.g., alerting of responsible parties) of subtle, or minute, anomalies (e.g., potential deviations in model performance) before these issues compound into significant downstream problems (e.g., affected dependent services, disruption of consumer experience, and/or the like), thus accelerating maintenance and resolution efforts.

In some aspects, the system can identify propagation of anomalous data characteristics and/or properties of reference data samples for updating a statistical inference model. As an example, the system can capture (e.g., in real-time) a sequence of reference data samples (e.g., a pair of corresponding input and output features) corresponding to a statistical inference model. From the captured sequence, the system can generate multiple sample distributions (e.g., groups of reference data samples) with respect to a reference sequence value (e.g., an order position, a timestamp, and/or the like). By comparing the sample distributions, the system can evaluate a divergence metric (e.g., Kolmogorov-Smirnov score) indicating approximate deviations in input feature patterns (e.g., shifts in data distributions) of the reference dataset. In another example, the system can selectively discriminate anomalous inference data samples that demonstrate high content similarities (e.g., cross-feature correlation) between the corresponding input and output parameters, indicating presence of irrelevant and/or inaccessible input information (e.g., leakage of training data) within the reference dataset.

Advantages of the disclosed system include an intelligent feature analysis process for discriminating critical data features (e.g., high impact input parameters) corresponding to anomalous data properties (e.g., pairs of input and output parameters indicative of a shift and/or leakage of data) of model reference data samples. As a result, the system enables users (e.g., authorized maintenance personnel) to rapidly target and resolve issues pertaining to reference (e.g., training) data of the statistical inference model prior to realized performance issues.

For illustrative purposes, examples are described herein in the context of proactive detection, and resolution, of anomalous data properties (e.g., shift and/or leakage of data parameters) found in reference data for updating statistic inference models (e.g., machine learning models). However, a person skilled in the art will appreciate that the disclosed system can be applied in other contexts. For example, the disclosed system can be used within distributed computer systems to dynamically manage configurations of functional components (e.g., data transfer protocols, optimization of executable processes) based on identified anomalous patterns, features, and/or signals of a reference asset.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

System Overview

FIG. 1 is a block diagram showing an illustration of a model diagnostics system 100 ("system 100") that can implement aspects of the present technology. The system 100 can comprise a logical component 102 that is configured to monitor, and evaluate, captured data samples 122 (e.g., measured conditions of real-world environment) for updating a statistical inference model 110 (e.g., a machine learning model, a large language model, and/or the like). As an example, the system 100 can configure the logical component 102 to generate an interactive diagnostic report 124 that enables an end user 112 (e.g., an authorized person, a maintenance staff, and/or the like) to review and/or resolve anomalous data patterns (e.g., input feature deviations) found within the captured data samples 122. The system 100 can communicatively couple the logical component 102 to interfacing user devices of the end user 112 to present the diagnostic report 124. The logical component 102 of system 100 can be one or more of: a data model, a machine learning model, a computer program, or other logical components configured for receiving, transmitting, analyzing captured data samples 122 (e.g., for the statistical inference model 110)—and/or processing—related data.

The system can further comprise a monitored database 104 (e.g., similar to example databases 515 and 525 of FIG. 5) that is configured to receive (e.g., in continuous and/or real-time) captured data samples 122 for the statistical inference model 110 from one or more data sources 114 (e.g., an external user, an automated server process, a third-party service, and/or the like). The system 100 can communicatively couple (e.g., via an API service) the logical component 102 to the monitored database 104 for accessing and/or storing the captured data samples 122 and corresponding analytics information. For example, the system 100 can configure the logical component 102 to read and/or write data associated with the diagnostics report 124 at the monitored database 104.

The system 100 can configure the logical component 102 to enable an end user 112 to link a statistical inference model 110 for active detection of anomalous feature patterns within data samples 122 captured from one or more data sources 114. As an illustrative example, the logical component 102 can enable a user 112 to subscribe a machine learning model for real-time monitoring and/or discrimination (e.g., identification, classification, and/or the like) of anomalous quantitative patterns (e.g., significant distribution shift probabilities) for critical input features (e.g., highly correlative and/or predictive data parameters) across data samples 122 received (e.g., via an API) from a regularly updating data source 114 (e.g., a national data repository, a publicly available data API, and/or the like). In some implementations, the logical component 102 can be configured to generate a custom diagnostic report 124 for the statistical inference model 110 based on an analytical configuration (e.g., target data features, modified tolerance thresholds, custom reference positions, and/or the like) set by the end user 112. In other implementations, the logical component 102 can be configured (e.g., at user 112 selection) to automatically recalibrate (e.g., retrain, finetune, and/or the like) the linked statistical inference model 110 in response to detection of significant anomalous data patterns (e.g., fails to satisfy tolerance threshold, exceeds acceptable range, and/or the like) from the captured data samples 122.

The system 100 can configure the logical component 102 to capture, and store, data samples 122 (e.g., received from data sources 114) at the monitored database 104. For example, the logical component 102 can deploy a set of listeners (e.g., background detection programs) to continuously monitor communications channels (e.g., a third-party API, web sockets, and/or the like) coupled to specified data sources 114 and download copies of new data samples 122 to the monitored database 104. The logical component 102 can be further configured to verify that contents of each received data sample 122 comprises a set of input features and a corresponding set of output features (e.g., expected model prediction labels). In some implementations, the logical component 102 can be configured to capture the data samples 122 from the data sources 114 in an organized sequence based on a specified order criterion (e.g., timestamp received from data source 114) and/or additional metadata information associated with the data samples 122 (e.g., timestamp of sample generation).

The system 100 can configure the logical component 102 to present a diagnostic report 124 to an end user 112 that records detection (e.g., or absence) and interpretive analysis (e.g., categorical discrimination, distribution shift patterns, and/or the like) of anomalous data feature patterns in the captured data samples 122. For example, the logical component 102 can respond to an identified divergence pattern for critical input feature distributions via transmitting (e.g., to a user interface) a diagnostic report 124 that comprises identifiable feature information (e.g., stored location of compromised data sample), a characteristic profile (e.g., data drift, concept drift, and/or the like) of detected anomalous patterns, and/or actionable remediation strategies (e.g., option for recalibrating model). In some implementations, the logical component 102 can configure the diagnostic report 124 to display and/or provide (e.g., at the user interface) a user interactive element that enables the end user 112 to cause additional processes (e.g., generation of new training dataset, navigation to storage location of data samples, creation of analytical visuals, configuration of diagnostic processes) of the system 100.

Model Diagnostics System

Figure 2A:
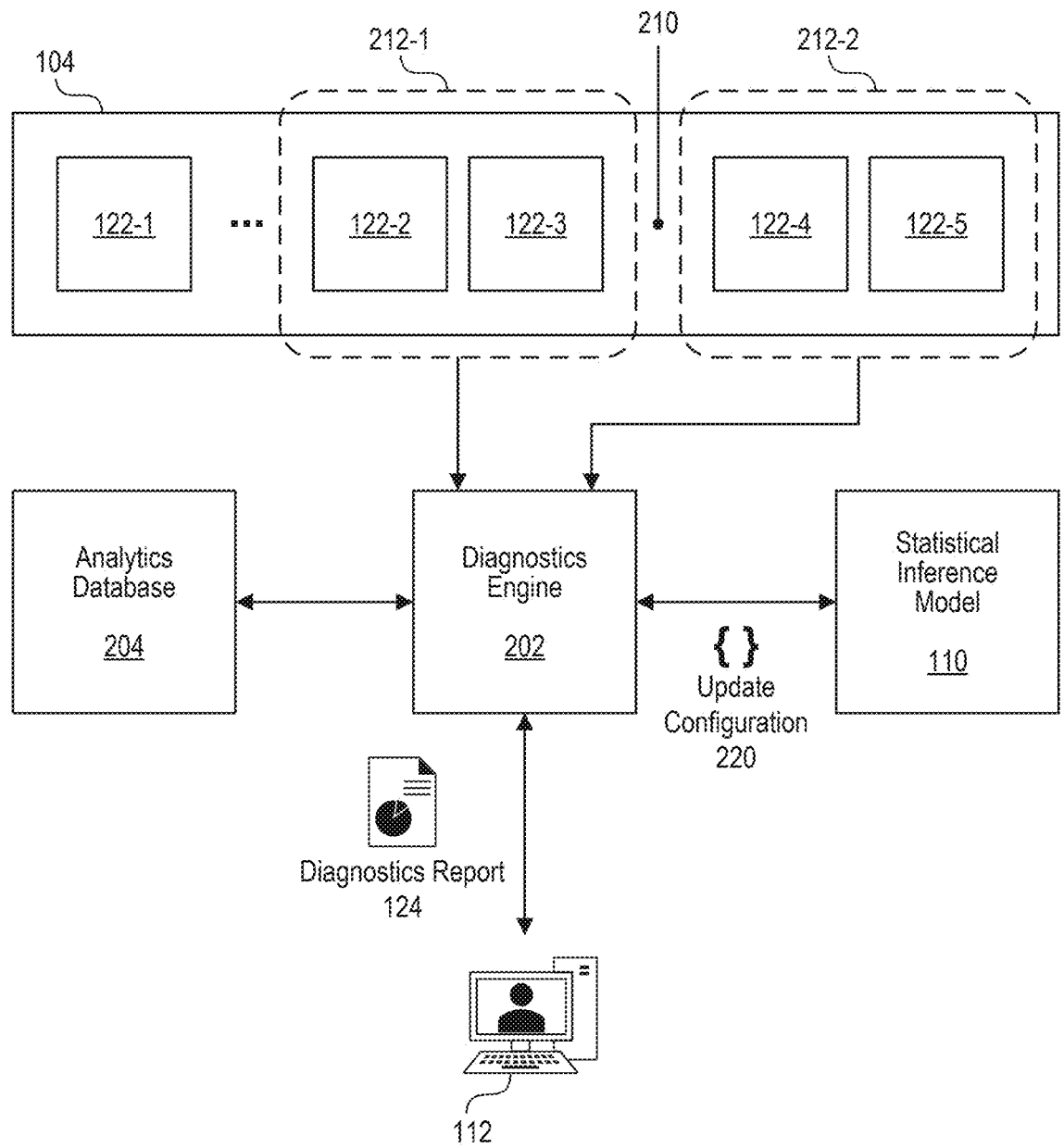
FIGS. 2A-2B are block diagrams illustrating functioning of the model diagnostics system in accordance with some implementations of the present technology.
Figure 2B:
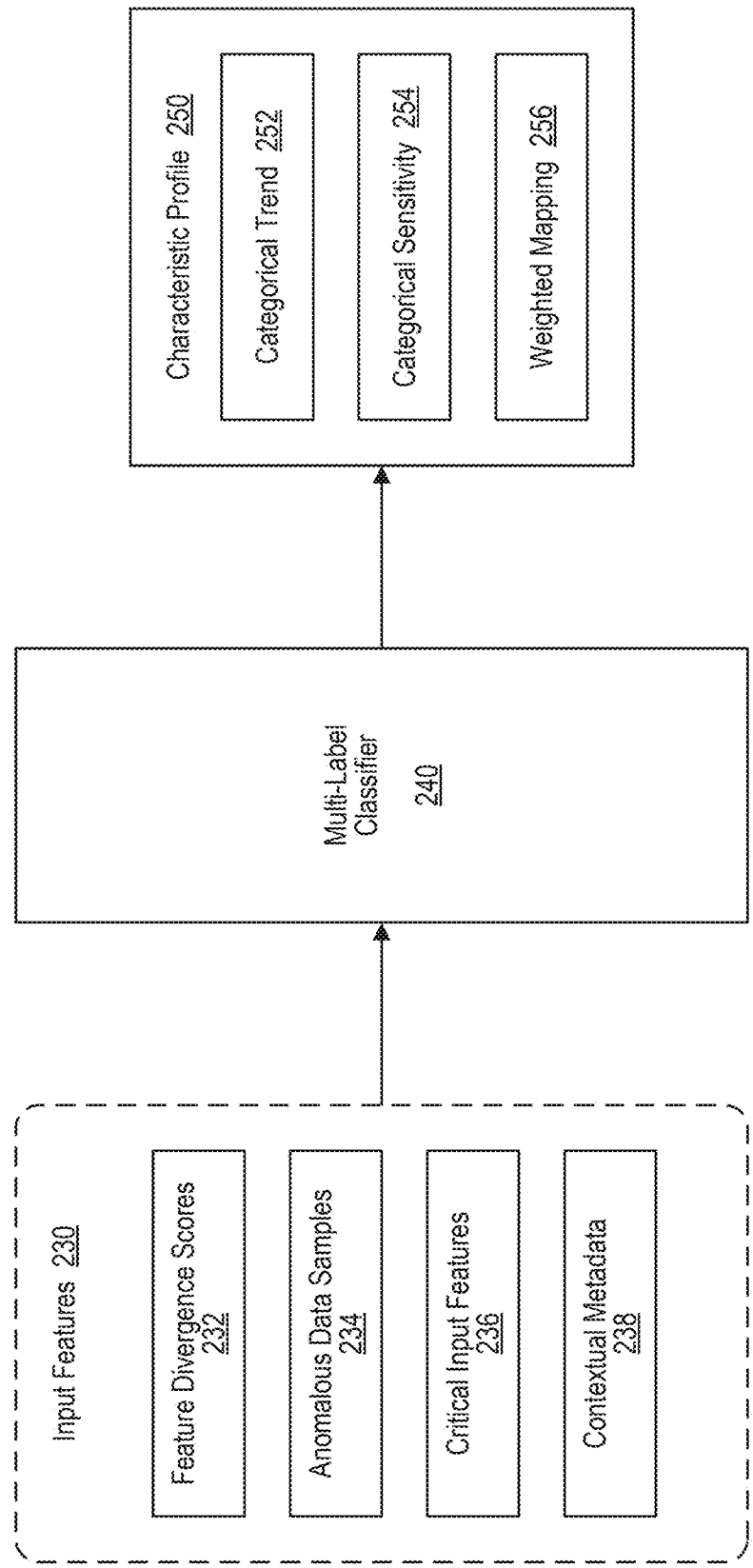

FIGS. 2A-2B are block diagrams illustrating functioning of the model diagnostics system in accordance with some implementations of the present technology. The illustrated interactions can be performed via diagnostics engine 202 ("engine 202") configured to execute one or more operations engaged in by an end user 112, a statistical inference model 110, a sequence of captured data samples 122-1 through 122-5, a diagnostic report 124, an analytics database 204, a reference sequence value 210, a data sample distribution 212-1, 212-2, and an update configuration 220. Diagnostics engine 202 is implemented using components of example computing devices 520 illustrated and described in more detail with reference to FIG. 5. Likewise, implementations of example interactions can include different and/or additional components or can be connected in different ways.

As shown in FIG. 2A, the diagnostics engine 202 can be configured to access a continuous sequence (e.g., a real-time stream) of data samples 122 (e.g., input and output feature pairs) captured from one or more data sources 114 that provide training data (e.g., latest observed information) for updating a statistical inference model 110. For example, the engine 202 can deploy listener modules (e.g., background monitoring processes) that actively download (e.g., via an API, web socket, and/or the like) copies of readily available data samples 122 from the data sources 114 onto the monitored database 104. In some implementations, the engine 202 can arrange the captured sequence of data samples 122 according to an ordering criterion (e.g., timestamp, priority position, and/or the like). As an example, the engine 202 can arrange the captured sequence of data samples 122 based on the order in which each data sample 122 was accessed and/or stored onto database 104 (e.g., a computational stack). As shown in FIG. 2A, a first received data sample 122-1 is assigned a higher priority position (e.g., earlier sequence order) than a second received data sample 122-2. In other implementations, the engine 202 can receive data samples 122 from the data sources 114 as groupings or sizable dataset blocks of multiple data samples 122.

The diagnostics engine 202 can be configured to identify and/or discriminate anomalous data feature patterns present in the captured sequence of data samples 122. To adequately capture the characteristic profile (e.g., data distribution 212 and/or probability forecast) of observed anomalous feature patterns, the engine 202 can execute a series of diagnostic processes to evaluate the captured sequence data samples 122. As an example, the engine 202 can compare select sample distributions 212 (e.g., a set of data samples, a plurality of datasets) to generate an approximate feature divergence score 232 for the captured sequence of data samples 122. In another example, the engine 202 can perform an instance comparison (e.g., between data samples) of input features to identify and/or discriminate a set of anomalous data samples 234 from the captured sequence. As discussed further herein, the engine 202 can analyze a combination of the calculated feature divergence score 232 and identified set of anomalous data samples 234 to determine an approximate characteristic profile for the latest data samples 122.

The diagnostics engine 202 can be configured to approximate a feature divergence score 232 for the captured sequence of data samples 122 that quantitatively compares feature values (e.g., input variables) between groups of data samples. In particular, the engine 202 can selectively generate a plurality of data sample distributions 212 with respect to a reference sequence value 210. As shown in FIG. 2A, the engine 202 can use the reference sequence value 210 (e.g., located between data samples 122-3, 122-4) to determine a first sample distribution 212-1 comprising data samples 122-2, 122-3 received prior to the position 210 and a second sample distribution 212-2 comprising data samples 122-4, 122-5 received after the position 210. By comparing feature values (e.g., numeric weights, classification labels, and/or the like) of the first sample distribution 212-1 and corresponding feature values of the second sample distributions 212-2 via a statistical divergence method (e.g., Kolmogorov-Smirnov (KS), Population Stability Index (PSI), Page-Hinkley, and/or the like), the engine 202 can estimate a feature divergence score 232 that represents deviations in feature values (e.g., data drift) of data samples between the first and the second sample distributions. In some implementations, the engine 202 can compare non-quantitative features (e.g., alphanumeric text) of data samples 122 for the sample distributions 212. As an example, the engine 202 can comprise a translation engine, such as a natural language algorithm (e.g., a large language model, a generative machine learning model, and/or the like), that is configured to transform and/or convert the non-quantitative feature values (e.g., natural language, human-readable text) into a quantitative format (e.g., a tokenized embedding). Accordingly, the engine 202 can compare these quantitative forms of the original data sample features via the described statistical divergence methods to determine the feature divergence score 232. In additional or alternative implementations, the engine 202 can be configured to further evaluate the feature divergence score 232 using a combination (e.g., a composite embedding) of quantitative (e.g., numeric variables) and non-quantitative features (e.g., alphanumeric text) of data samples 122 for the sample distributions 212. Although the example distributions 212-1, 212-2 of FIG. 2A depict comprising equal quantities of data samples 122, a person skilled in the art will appreciate that the engine 202 can generate sample distributions 212 that comprise varying quantities of data samples 122 (e.g., based on user 112 configuration). As an example, the engine 202 can generate a first sample distribution 212-1 comprising a first quantity of data samples 122 (e.g., prior to reference position 210) and a second sample distribution 212-2 comprising a second, different quantity of data samples 122 (e.g., after the reference position 210). In additional or alternative implementations, the engine 202 can store generated feature divergence scores 232 at the analytics database 204.

In some implementations, the engine 202 can be configured to compare different intervals of the captured sequence of data samples 122 via a plurality of feature divergence scores 232. For example, the engine 202 can generate a first feature divergence score 232 via comparison of a first and a second sample distribution 212 for the captured sequence of data samples 122. Further, the engine 202 can generate a second feature divergence score 232 via comparison of a third and a fourth sample distribution 212 for the captured sequence of data samples 122 (e.g., different from the first and the second sample distributions). Accordingly, the engine 202 can compare the first and the second feature divergence scores 232 to identify a progressive deviation in input features of data samples 122 between a first observation interval (e.g., evaluation window) comprising the first and the second distributions 212 and a second observational interval comprising the third and the fourth distributions 212.

As a first example, the engine 202 can evaluate a first feature divergence score 232 between a first sample distribution 212 comprising a first quantity of data samples 122 prior to a reference position 210 and a second sample distribution comprising a second quantity, less than the first quantity, of data samples 122 after the reference position 210. The engine 202 can further evaluate a third feature divergence score 232 between a third sample distribution 212 comprising a third quantity, less than the first quantity, of data samples 122 prior to a reference position 210 and a fourth sample distribution comprising a fourth quantity, greater than the second quantity, of data samples 122 after the reference position 210. Accordingly, the engine 202 can compare the first and the second feature divergence scores 232 to assess gradual variations of input feature deviations between translating observational intervals (e.g., sliding window of assessment).

As a second example, the engine 202 can evaluate a first feature divergence score 232 between a first sample distribution 212 comprising a first quantity of data samples 122 prior to a reference position 210 and a second sample distribution comprising the same first quantity of data samples 122 after the reference position 210. The engine 202 can further evaluate a third feature divergence score 232 between a third sample distribution 212 comprising a second quantity, a discrete scalar multiple of the first quantity, of data samples 122 prior to a reference position 210 and a fourth sample distribution comprising the same second quantity of data samples 122 after the reference position 210. Accordingly, the engine 202 can compare the first and the second feature divergence scores 232 to assess rapid instantaneous variations of input feature deviations between incremental observational intervals.

As a third example, the engine 202 can evaluate a first feature divergence score 232 between a first sample distribution 212 comprising a first quantity of data samples 122 prior to a reference position 210 and a second sample distribution comprising a second quantity of data samples 122 after the reference position 210. The engine 202 can further evaluate a third feature divergence score 232 between a third sample distribution 212 comprising the first quantity of data samples 122 prior to a second reference position 210 and a fourth sample distribution comprising the second quantity of data samples 122 after the second reference position 210. Accordingly, the engine 202 can compare the first and the second feature divergence scores 232 to assess repetitive variations of input feature deviations between different observational intervals.

The engine 202 can be configured perform an instance comparison (e.g., between data samples) of input features to identify and/or discriminate anomalous data samples 234 from the captured sequence. For example, the engine 202 can identify and/or discriminate anomalous data samples 234 from the captured sequence that comprise input feature parameters that are identical, or near identical, to one or more output feature parameters. The engine 202 can estimate (e.g., via cosine similarity, Euclidean distance, and/or additional comparative statistical algorithms) a feature alignment score (e.g., feature correlation values) between input features and output features of an individual data sample 122 of the captured sequence. In some implementations, the engine 202 can use a machine learning model (e.g., a neural network, a natural language processor, a generative machine learning model, and/or the like) to generate approximate semantic correlation weights between the input features and output features of the data sample 122. For example, the engine 202 can comprise a translation engine, such as a natural language algorithm (e.g., a large language model, a generative machine learning model, and/or the like), that is configured to transform and/or convert alphanumeric values (e.g., human-readable text) of the data sample 122 into a quantitative representation (e.g., a tokenized embedding). By comparing the quantitative forms of the input and output features (e.g., of the data sample 212), the engine 202 can generate an approximate semantic feature alignment score. Accordingly, the engine 202 can use the estimated feature alignment score to discriminate anomalous data samples 234 that exceed a similarity threshold (e.g., or fails to satisfy a tolerance threshold), indicating strong feature similarities (e.g., data leakage) between the input features and the corresponding output features. In some implementations, the engine 202 can require a manual review (e.g., via a user interface) from an end user 112 to validate (e.g. or reject) the approximated content similarities between input and output features of select data samples. In a further example, the engine 202 can identify and/or discriminate anomalous data samples 234 that correspond to a timestamp of origin that is after a reference timestamp. In additional, or alternative implementations, the engine 202 can generate a time-series data that indicates relative frequency of detected anomalous data samples 234 (e.g., quantity of identified samples) over a time period. For example, the engine 202 can create a time-series data such that each data point is assigned to a time interval range (e.g., based on corresponding timestamp) and a mapping to a set of anomalous data samples 234 corresponding to timestamps within the time interval range.

The diagnostics engine 202 can generate a diagnostics report 124 for a statistical inference model 110 based on estimated feature divergence scores 232 and identified anomalous data samples 234 of the captured sequence of data samples 122. For example, the engine 202 can identify a set of critical input features 236 (e.g., highly correlated input features between data samples) from the identified anomalous data samples 234 (e.g., via feature importance analysis algorithms) in response to a feature divergence score 232 failing to satisfy a divergence tolerance threshold. In some implementations, the engine 202 can invoke a machine learning model (e.g., a neural network, a feature importance analysis method, and/or the like) to determine the set of critical input features 236 from the data samples 122. In other implementations, the engine 202 can dynamically determine a contextual metadata 238 (e.g., a complementary data structure) for the identified set of critical input features 236. For example, the engine 202 can access (e.g., from a remote database) one or more reference parameters (e.g., an assigned feature identifier, a partial source code, a link to relevant data samples, and/or the like) that correspond to one or more critical input features 236.

In some implementations, the engine 202 can determine a characteristic profile 250 for a set of identified critical input features 236. As shown in FIG. 2B, the engine 202 can use the identified feature divergence scores 232, anomalous data samples 234, critical input features 236, and/or contextual metadata 238 as input features 230 to predict a set of characteristic attributes (e.g., of the sequence of data samples 122) via a multi-label classifier 240 (e.g., a machine learning model, a generative learning model, and/or the like). For example, the engine 202 can invoke the multi-label classifier 240 to estimate an approximate categorical trend 252 (e.g., a sudden drift, a gradual drift, an incremental drift, and/or a recurrent drift) that indicates an approximate distribution forecast (e.g., expected variations in data feature patterns) for the captured sequence of data samples 122 over a time interval. In another example, the engine 202 can invoke a fine-grained model (e.g., a regressive model) to estimate a quantitative strength, or sensitivity 254, of a plurality of categorical trends 252 for the captured sequence of data samples 122. Accordingly, the engine 202 can use a precision threshold (e.g., a confidence threshold) to determine a subset of predictive categorical trends 252 with high likelihood of representing future distribution patterns for the identified critical input features 236. In another example, the engine 202 can generate (e.g., via a predictive model) a weighted mapping 256 between the input features 230 (e.g., feature divergence scores 232, anomalous data samples 234, critical input features 236, and/or contextual metadata 238) to attributes of the characteristic profile 250 (e.g., quantitative categorical trend 252, categorical sensitivity 254). For example, the engine 202 can assign a relevance factor (e.g., a scalar multiplier) to an observed feature divergence score 232 and/or anomalous data sample 234 that corresponds to a representative strength (e.g., an amplified, or diminished, priority) in determining a specified attribute of the characteristic profile 250. Accordingly, the engine 202 can use weighted mapping 256 (e.g., of relevance factors) to approximate a composite score (e.g., a sensitivity value) of a characteristic attribute as a weighted combination (e.g., a weighted sum) of the observed feature divergence scores 232 and anomalous data samples 234. In some implementations, the engine 202 can determine the weighted mapping 256 based on a predetermined set of priority factors (e.g., analytical preferences of an authorized user). Accordingly, the engine 202 can generate a diagnostics report 124 that presents the predicted feature divergence scores 232, anomalous data samples 234, set of critical input features 236, contextual metadata 238, and/or categorical profile 250 for the captured sequence of data samples 122 In further implementations, the engine 202 can also configure the diagnostics report 124 to comprise navigation information (e.g., a redirect link, an access credential, a hardware component, and/or the like) to enable users 112 to find a stored location of the anomalous data samples 234.

The diagnostics engine 202 can transmit (e.g., via an API) the diagnostics report 124 for display and/or provide at a user interface of the end user 112. For example, the engine 202 can transmit a notification payload comprising configuration instructions to display content information (e.g., critical input features, anomalous data samples 234, characteristic profile, and/or the like) of the diagnostics report 124 at custom user interactable interface elements for displaying information from the diagnostics report 124. In some implementations, the engine 202 can modify the configuration instructions (e.g., prior to transmission) to enable user interactable interface elements to transmit information (e.g., user input data, user interaction log, and/or the like) back to the engine 202. For example, the engine 202 can configure the notification payload to deploy an interactive element (e.g., a button) that, when pressed by an end user 112, requests the engine 202 to automatically apply a new update configuration 220 (e.g., excluding anomalous data samples 234) for the statistical inference model. In another example, the engine 202 can configure the notification payload to deploy a visual element (e.g., a chart, a graph, and/or the like) that graphically displays the time-series frequency data for detected anomalous data samples 234 at the user interface. In a further example, the engine 202 can configure the notification payload to display a human-readable narrative that indicates a recommended remediation procedure (e.g., immediate model update, delayed response activity, and/or the like). In some implementations, the engine 202 can dynamically determine the recommended remediation procedure based, at least in part, on the characteristic profile of the critical input features. For example, the engine 202 can prioritize recommendation of an immediate (e.g., or delayed) action when a characteristic attribute (e.g., quantitative categorical trend) of the critical features corresponds to a sensitivity score that meets (e.g., or, alternatively, fails to meet) a specified threshold.

Figure 3:
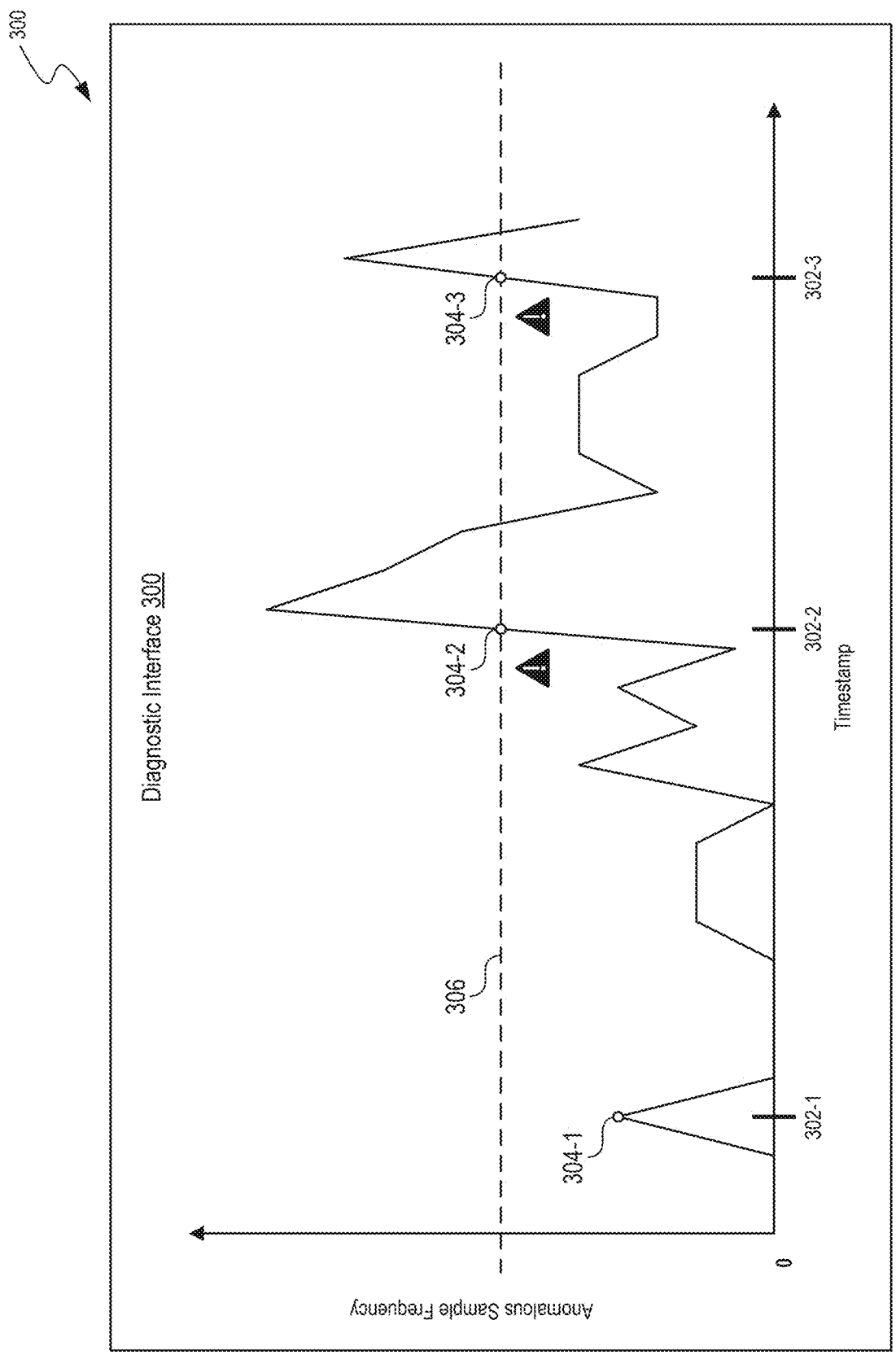
FIG. 3 is a block diagram illustrating an example configuration of a diagnostic interface of a model diagnostics system, in accordance with some implementations of the present technology.

FIG. 3 is a block diagram illustrating an example configuration of a diagnostic interface 300 of a model diagnostics system, in accordance with some implementations of the present technology. The diagnostic interface 300 ("interface 300") includes a timestamp component 302, an anomalous sample frequency component 304, and a tolerance threshold 306. The diagnostics engine described herein is the same as, or similar to, the diagnostics engine 202 illustrated and described in more detail with reference to FIGS. 2A-2B. Likewise, implementations of example components of the custom diagnostic interface 300 can include different and/or additional components or can be connected in different ways.

The diagnostics engine can be configured to display and/or provide frequency data for detected anomalous data feature patterns of captured data samples 122 for a statistical inference model 110. As shown in FIG. 3, the interface 300 can be configured to visualize a time-series representation of anomalous data sample counts and/or scores for the captured data samples 122. The interface 300 can comprise a graphical view that maps time-dependent anomalous sample frequency counts (e.g., dependent variable) within a specified time interval (e.g., independent variable). Accordingly, the interface 300 can plot a visual trend that tracks the local anomalous sample frequency count across individual time increments. For example, the interface 300 can plot the anomalous sample frequency components 304-1 through 304-3 at the corresponding timestamp components 302-1 through 302-3.

The interface 300 can be configured to generate visual markings (e.g., symbols, highlights, dynamic alerts) that aid end users 112 (e.g., authorized users) of the model diagnostics system in identifying critical sample frequency data. As shown, the interface 300 can prominently display both the tolerance threshold 306 (e.g., dotted line) and trend plot for the anomalous sample frequency data (e.g., solid line) using distinguishing visual markings. In another example, the interface 300 can display a notification symbol (e.g., an alert icon) within proximity of anomalous sample frequency components 304-2, 304-3 that meet, or surpass, the tolerance threshold 306, as depicted in FIG. 3.

Figure 4:
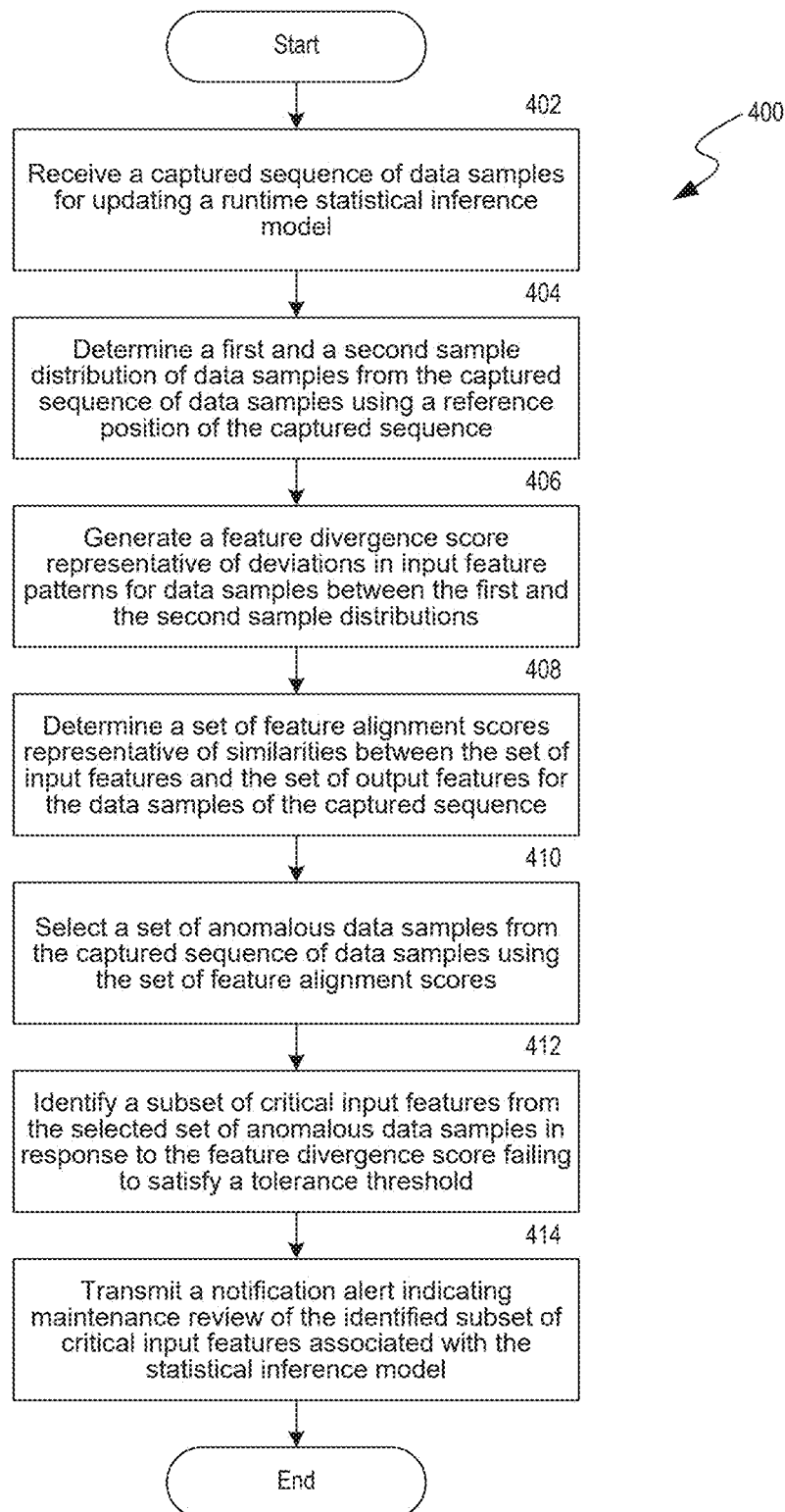
FIG. 4 is a flow diagram that illustrates a process to generate model maintenance recommendations in some implementations.

FIG. 4 is a flow diagram that illustrates a process 400 to generate model maintenance recommendations in some implementations. The process 400 can be performed by a system (e.g., model diagnostics system 100) configured to identify, and report, critical and/or compromised input features of a statistical inference model based on detected anomalous data samples. In one example, the system includes at least one hardware processor and at least one non-transitory memory storing instructions, which, when executed by the at least one hardware processor, cause the system to perform the process 400. In another example, the system includes a non-transitory, computer-readable storage medium comprising instructions recorded thereon, which, when executed by at least one data processor, cause the system to perform the process 400.

At 402, the system can receive (e.g., via an API) a captured sequence of data samples for updating a runtime statistical inference model. For example, the system can receive an ordered (e.g., time-series) sequence of data samples such that each data sample comprises a set of input features and a corresponding set of output features (e.g., prediction outputs of statistical inference model based on input features).

At 404, the system can determine a first sample distribution of data samples and a second sample distribution of data samples from the captured sequence of data samples. For example, the system can use a reference position (e.g., a sequence order, a timestamp, and/or the like) to separate the captured sequence of data samples into a first and a second sample distributions. In some implementations, the system can determine a first sample distribution that comprises data samples corresponding to sequence values prior to the reference position and a second sample distribution that comprises data samples corresponding to sequence values following the reference position.

At 406, the system can generate a feature divergence score representative of deviations in input feature patterns for data samples between the first and the second sample distributions. For example, the system can compare the set of input features between data samples of the first and the second sample distributions to estimate the feature divergence score.

In some implementations, the system can calculate additional divergence scores that compare different sample distributions of the captured sequence. For example, the system can determine a third and a fourth sample distributions of data samples from the captured sequence that are separate from the first and second sample distributions of data samples. By comparing the third and fourth sample distributions the system can generate a second feature divergence score representative of deviations in input feature patterns for data samples between the third and the fourth sample distributions. In further implementations, the system can compare the second feature divergence score of the third and fourth sample distributions with the first feature divergence score of the first and the second sample distributions to evaluate deviation patterns between different combinations of sample distributions.

In some implementations, the system can configure the third sample distribution to comprise a lower quantity of data samples corresponding to sequence values prior to the reference position than the first sample distribution and the fourth sample distribution to comprise a higher quantity of data samples corresponding to sequence values following the reference position than the second sample distribution. In further implementations, the system can configure the third sample distribution to comprise a first quantity of data samples corresponding to sequence values prior to the reference position and the fourth sample distribution to comprise a second quantity of data samples corresponding to sequence values following the reference position such that the first quantity and the second quantity are scaled by an incremental factor of the quantity of data samples of the first sample distribution and the quantity of data samples of the second sample distribution respectively. In additional, or alternative implementations, the system can configure the third sample distribution to comprise data samples corresponding to sequence values prior to a second reference position of the captured sequence and the fourth sample distribution to comprise data samples corresponding to sequence values following the second reference position.

At 408, the system can determine a set of feature alignment scores representative of similarities (e.g., or differences) between the set of input features and the set of output features for the data samples of the captured sequence. In some implementations, the system can determine the set of feature alignment scores via prompting a generative machine learning model to generate a set of approximate semantic correlation weights between the set of input features and the set of output features for the data samples of the captured sequence.

At 410, the system can select a set of anomalous data samples from the captured sequence of data samples. For example, the system can use the set of feature alignment scores to select at least one anomalous data sample corresponding to a feature alignment score that fails to satisfy an alignment threshold. In some implementations, the system can identify at least one compromised dataset based on a subset of the set of anomalous data samples such that each anomalous data sample is assigned to the at least one compromised dataset. In further implementations, the system can generate a time-series frequency plot based on the set of anomalous data samples such that each data point of the time-series frequency plot comprises a time interval range (e.g., a definite grouping) and a subset of anomalous data samples corresponding to timestamps within the time interval range. In additional, or alternative implementations, the system can use a reference timestamp to determine at least one data sample of the captured sequence that corresponds to a timestamp following the reference timestamp. Accordingly, the system can add the at least one data sample to the set of anomalous data samples.

At 412, the system can identify a subset of critical input features from the selected set of anomalous data samples in response to the feature divergence score failing to satisfy a tolerance threshold. For example, the system can identify critical input features such that each critical input feature is associated with high correlation between the sets of input features of at least two anomalous data samples from the first or the second sample distributions. In some implementations, the system can identify a second subset of critical input features from the selected set of anomalous data samples in response to a comparison of a first and a second feature divergence scores failing to satisfy a second tolerance threshold. For example, the system can identify a second subset of critical input features such that each critical input feature of the second subset is associated with high correlation between the sets of input features of at least two anomalous data samples from the third or the fourth sample distributions.

At 414, the system can transmit a notification alert indicating maintenance review of the identified subset of critical input features associated with the statistical inference model. In some implementations, the system can configure the notification alert to display and/or provide a user interactive element that, when selected, automatically performs an update of the statistical inference model. In response to a user selection (e.g., via the user interactive element) for automatically performing the update of the statistical inference model, the system can generate a set of training data samples from the captured sequence of data samples for refining the statistical inference model. For example, the system can generate a set of training data samples such that the set of training data samples comprises data samples from the captured sequence that are not present in the set of anomalous data samples. Accordingly, the system can use the generated set of training data samples to update the statistical inference model using the set of training data samples.

In some implementations, the system can further configure the notification alert prior to transmission. For example, the system can configure the notification alert to indicate required maintenance review of the second identified subset of critical input features associated with the statistical inference model. In another example, the system can configure the notification alert to display and/or provide a separate user interactive element that, when selected, automatically navigates to a stored location of the at least one compromised dataset. In a further example, the system can configure the notification alert to display and/or provide the time-series frequency plot at a graphical interface element that comprises at least one visual marking for distinguishing data points that exceed a frequency tolerance threshold.

In some implementations, the system can predict (e.g., using a machine learning model) a diagnostic category for characterizing and/or discriminating the set of anomalous data samples and the feature divergence score of the first and the second sample distributions. For example, the system can predict a diagnostic category that corresponds to a specific compromised data pattern for the first and the second sample distributions. Accordingly, the system can configure, prior to transmission, the notification alert to further display and/or provide the predicted diagnostic category and/or at least one human-readable narrative that describes a recommended resolution procedure for rectifying the specific compromised data pattern.

In some implementations, the system can automatically perform one or more corrective actions using the identified subset of critical input features and/or the selected set of anomalous data samples associated with the statistical inference model. For example, the system can dynamically generate a positive (e.g., or negative) training dataset comprising data samples (e.g., from the captured sequence) that are not present (or alternatively, are present) in the set of anomalous data samples. Accordingly, the system can store the generated training datasets on a remote database (e.g., a temporary cache, a separate memory partition, and/or the like) in parallel to transmitting the notification alert such that the training datasets are readily available for updating the statistical inference model. In a further example, the system can automatically update (e.g., re-train, finetune) the statistical inference model using the generated training datasets in parallel (e.g., or prior) to transmitting the notification alert such that the updated statistical inference model is readily available for deployment (e.g., upon receiving user selection). In another example, the system can respond to the identified critical input features and/or the anomalous data samples via a pre-emptive disablement (e.g., instance shutdown, service termination, access disconnection, and/or the like) of the statistical inference model. In other examples, the system can automatically apply prior resolution options previously invoked (e.g., by an authorized user) to update the statistical inference model. Accordingly, the system can further evaluate, and report (e.g., via the notification alert), initial performance results of the updated statistical inference model after applying the prior resolution options.

Example Computing Environment

Figure 5:
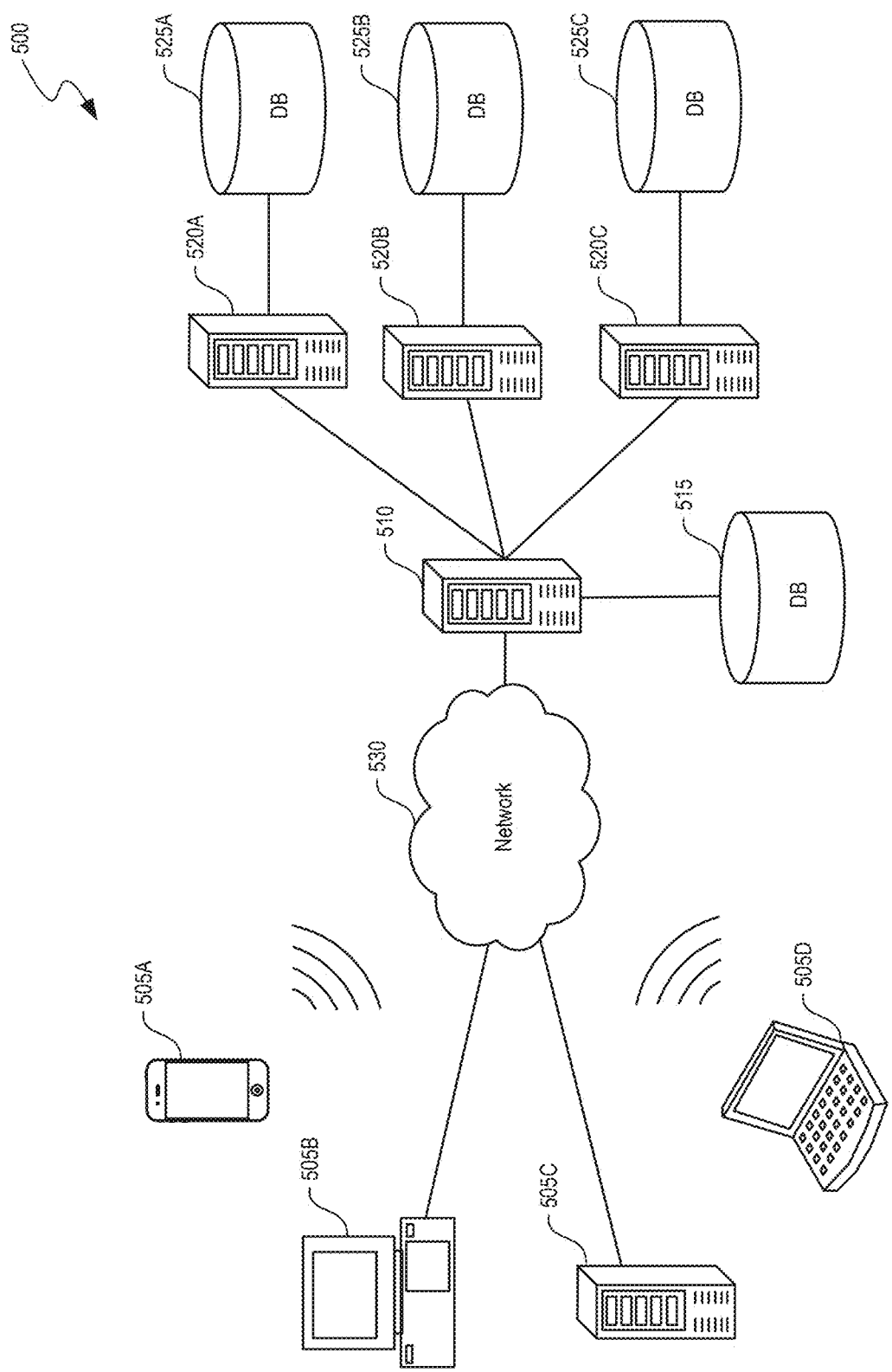
FIG. 5 is a system diagram illustrating an example of a computing environment in which the disclosed system operates in some implementations.

FIG. 5 is a system diagram illustrating an example of a computing environment in which the disclosed system operates in some implementations. In some implementations, environment 500 includes one or more client computing devices 505A-D, examples of which can host the model diagnostics system 100 of FIG. 1. Client computing devices 505 operate in a networked environment using logical connections through network 530 to one or more remote computers, such as a server computing device.

In some implementations, server 510 is an edge server which receives client requests and coordinates fulfillment of those requests through other servers, such as servers 520A-C. In some implementations, server computing devices 510 and 520 comprise computing systems, such as the model diagnostics system 100 of FIG. 1. Though each server computing device 510 and 520 is displayed logically as a single server, server computing devices can each be a distributed computing environment encompassing multiple computing devices located at the same or at geographically disparate physical locations. In some implementations, each server 520 corresponds to a group of servers.

Client computing devices 505 and server computing devices 510 and 520 can each act as a server or client to other server or client devices. In some implementations, servers (510, 520A-C) connect to a corresponding database (515, 525A-C). As discussed above, each server 520 can correspond to a group of servers, and each of these servers can share a database or can have its own database. Databases 515 and 525 warehouse (e.g., store) information such as claims data, email data, call transcripts, call logs, policy data and so on. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. In some implementations, network 530 is the Internet or some other public or private network. Client computing devices 505 are connected to network 530 through a network interface, such as by wired or wireless communication. While the connections between server 510 and servers 520 are shown as separate connections, these connections can be any kind of local, wide area, wired, or wireless network, including network 530 or a separate public or private network.

Machine Learning Models

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameter over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed, and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publically-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 6:
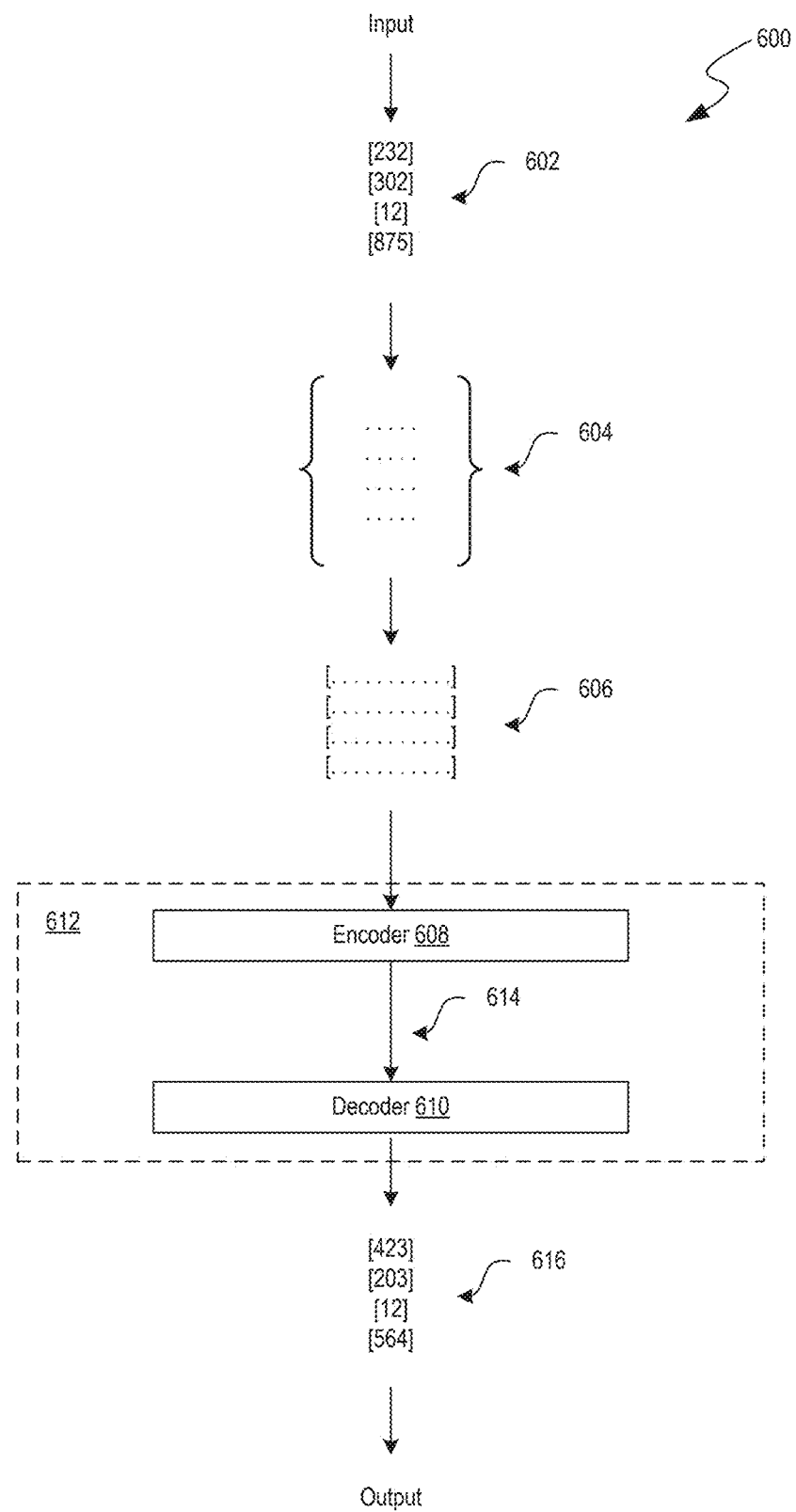
FIG. 6 is a block diagram of an example transformer that can implement aspects of the present technology.

FIG. 6 is a block diagram of an example transformer 612 that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 612 includes an encoder 608 (which can comprise one or more encoder layers/blocks connected in series) and a decoder 610 (which can comprise one or more decoder layers/blocks connected in series). Generally, the encoder 608 and the decoder 610 each include a plurality of neural network layers, at least one of which can be a self-attention layer. The parameters of the neural network layers can be referred to as the parameters of the language model.

The transformer 612 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 612 is trained to perform certain functions on other input formats than natural language input. For example, the input can include objects, images, audio content, or video content, or a combination thereof.

The transformer 612 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 6 illustrates an example of how the transformer 612 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 6, a short sequence of tokens 602 corresponding to the input text is illustrated as input to the transformer 612. Tokenization of the text sequence into the tokens 602 can be performed by some pre-processing tokenization module such as, for example, a byte-pair encoding tokenizer (the "pre" referring to the tokenization occurring prior to the processing of the tokenized input by the LLM), which is not shown in FIG. 6 for simplicity. In general, the token sequence that is inputted to the transformer 612 can be of any length up to a maximum length defined based on the dimensions of the transformer 612. Each token 602 in the token sequence is converted into an embedding vector 606 (also referred to simply as an embedding 606). An embedding 606 is a learned numerical representation (such as, for example, a vector) of a token that captures some semantic meaning of the text segment represented by the token 602. The embedding 606 represents the text segment corresponding to the token 602 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token.

The vector space can be defined by the dimensions and values of the embedding vectors. Various techniques can be used to convert a token 602 to an embedding 606. For example, another trained ML model can be used to convert the token 602 into an embedding 606. In particular, another trained ML model can be used to convert the token 602 into an embedding 606 in a way that encodes additional information into the embedding 606 (e.g., a trained ML model can encode positional information about the position of the token 602 in the text sequence into the embedding 606). In some examples, the numerical value of the token 602 can be used to look up the corresponding embedding in an embedding matrix 604 (which can be learned during training of the transformer 612).

The generated embeddings 606 are input into the encoder 608. The encoder 608 serves to encode the embeddings 606 into feature vectors 614 that represent the latent features of the embeddings 606. The encoder 608 can encode positional information (i.e., information about the sequence of the input) in the feature vectors 614. The feature vectors 614 can have very high dimensionality (e.g., on the order of thousands or tens of thousands), with each element in a feature vector 614 corresponding to a respective feature. The numerical weight of each element in a feature vector 614 represents the importance of the corresponding feature. The space of all possible feature vectors 614 that can be generated by the encoder 608 can be referred to as the latent space or feature space.

Conceptually, the decoder 610 is designed to map the features represented by the feature vectors 614 into meaningful output, which can depend on the task that was assigned to the transformer 612. For example, if the transformer 612 is used for a translation task, the decoder 610 can map the feature vectors 614 into text output in a target language different from the language of the original tokens 602. Generally, in a generative language model, the decoder 610 serves to decode the feature vectors 614 into a sequence of tokens. The decoder 610 can generate output tokens 616 one by one. Each output token 616 can be fed back as input to the decoder 610 in order to generate the next output token 616. By feeding back the generated output and applying self-attention, the decoder 610 is able to generate a sequence of output tokens 616 that has sequential meaning (e.g., the resulting output text sequence is understandable as a sentence and obeys grammatical rules). The decoder 610 can generate output tokens 616 until a special [EOT] token (indicating the end of the text) is generated. The resulting sequence of output tokens 616 can then be converted to a text sequence in post-processing. For example, each output token 616 can be an integer number that corresponds to a vocabulary index. By looking up the text segment using the vocabulary index, the text segment corresponding to each output token 616 can be retrieved, the text segments can be concatenated together, and the final output text sequence can be obtained.

In some examples, the input provided to the transformer 612 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally, or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally, or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Figure 7:
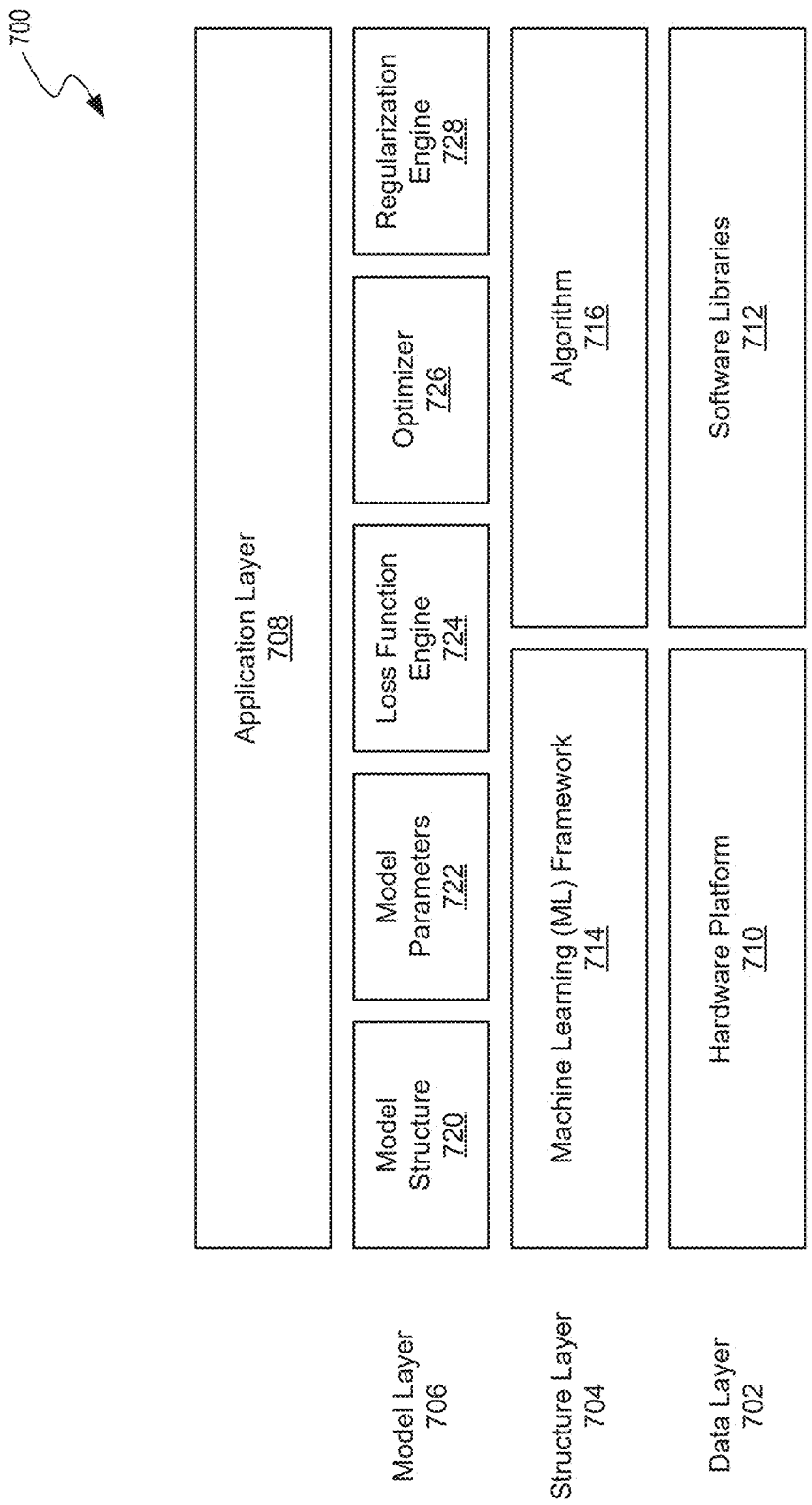
FIG. 7 illustrates a layered architecture of an artificial intelligence (AI) system 700 that can implement the ML models of the model diagnostics system, in accordance with some implementations of the present technology.

FIG. 7 illustrates a layered architecture of an artificial intelligence (AI) system 700 that can implement the ML models of the model diagnostics system 100 of FIG. 1, in accordance with some implementations of the present technology. Example ML models can include the models executed by the diagnostics engine 202 (e.g., or the logical component 102). Accordingly, the diagnostics engine 202 can include one or more components of the AI system 700.

As shown, the AI system 700 can include a set of layers, which conceptually organize elements within an example network topology for the AI system's architecture to implement a particular AI model. Generally, an AI model is a computer-executable program implemented by the AI system 700 that analyses data to make predictions. Information can pass through each layer of the AI system 700 to generate outputs for the AI model. The layers can include a data layer 702, a structure layer 704, a model layer 706, and an application layer 708. The algorithm 716 of the structure layer 704 and the model structure 720 and model parameters 722 of the model layer 706 together form an example AI model. The optimizer 726, loss function engine 724, and regularization engine 728 work to refine and optimize the AI model, and the data layer 702 provides resources and support for application of the AI model by the application layer 708.

The data layer 702 acts as the foundation of the AI system 700 by preparing data for the AI model. As shown, the data layer 702 can include two sub-layers: a hardware platform 710 and one or more software libraries 712. The hardware platform 710 can be designed to perform operations for the AI model and include computing resources for storage, memory, logic and networking, such as the resources described in relation to FIGS. 4 and 6. The hardware platform 710 can process amounts of data using one or more servers. The servers can perform backend operations such as matrix calculations, parallel calculations, machine learning (ML) training, and the like. Examples of servers used by the hardware platform 710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC). GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 710 can include computing resources, (e.g., servers, memory, etc.) offered by a cloud services provider. The hardware platform 710 can also include computer memory for storing data about the AI model, application of the AI model, and training data for the AI model. The computer memory can be a form of random-access memory (RAM), such as dynamic RAM, static RAM, and non-volatile RAM.

The software libraries 712 can be thought of suites of data and programming code, including executables, used to control the computing resources of the hardware platform 710. The programming code can include low-level primitives (e.g., fundamental language elements) that form the foundation of one or more low-level programming languages, such that servers of the hardware platform 710 can use the low-level primitives to carry out specific operations. The low-level programming languages do not require much, if any, abstraction from a computing resource's instruction set architecture, allowing them to run quickly with a small memory footprint. Examples of software libraries 712 that can be included in the AI system 700 include INTEL Math Kernel Library, NVIDIA cuDNN, EIGEN, and OpenBLAS.

The structure layer 704 can include an ML framework 714 and an algorithm 716. The ML framework 714 can be thought of as an interface, library, or tool that allows users to build and deploy the AI model. The ML framework 714 can include an open-source library, an application programming interface (API), a gradient-boosting library, an ensemble method, and/or a deep learning toolkit that work with the layers of the AI system facilitate development of the AI model. For example, the ML framework 714 can distribute processes for application or training of the AI model across multiple resources in the hardware platform 710. The ML framework 714 can also include a set of pre-built components that have the functionality to implement and train the AI model and allow users to use pre-built functions and classes to construct and train the AI model. Thus, the ML framework 714 can be used to facilitate data engineering, development, hyperparameter tuning, testing, and training for the AI model. Examples of ML frameworks 714 that can be used in the AI system 700 include TENSORFLOW, PYTORCH, SCIKIT-LEARN, KERAS, LightGBM, RANDOM FOREST, and AMAZON WEB SERVICES.

The algorithm 716 can be an organized set of computer-executable operations used to generate output data from a set of input data and can be described using pseudocode. The algorithm 716 can include complex code that allows the computing resources to learn from new input data and create new/modified outputs based on what was learned. In some implementations, the algorithm 716 can build the AI model through being trained while running computing resources of the hardware platform 710. This training allows the algorithm 716 to make predictions or decisions without being explicitly programmed to do so. Once trained, the algorithm 716 can run at the computing resources as part of the AI model to make predictions or decisions, improve computing resource performance, or perform tasks. The algorithm 716 can be trained using supervised learning, unsupervised learning, semi-supervised learning, and/or reinforcement learning.

Using supervised learning, the algorithm 716 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. Furthermore, training data can include pre-processed data generated by various engines of the model diagnostics system 100 described in relation to FIG. 1. The user may label the training data based on one or more classes and trains the AI model by inputting the training data to the algorithm 716. The algorithm determines how to label the new data based on the labeled training data. The user can facilitate collection, labeling, and/or input via the ML framework 714. In some instances, the user may convert the training data to a set of feature vectors for input to the algorithm 716. Once trained, the user can test the algorithm 716 on new data to determine if the algorithm 716 is predicting accurate labels for the new data. For example, the user can use cross-validation methods to test the accuracy of the algorithm 716 and retrain the algorithm 716 on new training data if the results of the cross-validation are below an accuracy threshold.

Supervised learning can involve classification and/or regression. Classification techniques involve teaching the algorithm 716 to identify a category of new observations based on training data and are used when input data for the algorithm 716 is discrete. Said differently, when learning through classification techniques, the algorithm 716 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 716 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 716 is continuous. Regression techniques can be used to train the algorithm 716 to predict or forecast relationships between variables. To train the algorithm 716 using regression techniques, a user can select a regression method for estimating the parameters of the model. The user collects and labels training data that is input to the algorithm 716 such that the algorithm 716 is trained to understand the relationship between data features and the dependent variable(s). Once trained, the algorithm 716 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 716 learns patterns from unlabeled training data. In particular, the algorithm 716 is trained to learn hidden patterns and insights of input data, which can be used for data exploration or for generating new data. Here, the algorithm 716 does not have a predefined output, unlike the labels output when the algorithm 716 is trained using supervised learning. Said another way, unsupervised learning is used to train the algorithm 716 to find an underlying structure of a set of data, group the data according to similarities, and represent that set of data in a compressed format.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 716 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 716 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 716 include factor analysis, item response theory, latent profile analysis, and latent class analysis.

The model layer 706 implements the AI model using data from the data layer and the algorithm 716 and ML framework 714 from the structure layer 704, thus enabling decision-making capabilities of the AI system 700. The model layer 706 includes a model structure 720, model parameters 722, a loss function engine 724, an optimizer 726, and a regularization engine 728.

The model structure 720 describes the architecture of the AI model of the AI system 700. The model structure 720 defines the complexity of the pattern/relationship that the AI model expresses. Examples of structures that can be used as the model structure 720 include decision trees, support vector machines, regression analyses, Bayesian networks, Gaussian processes, genetic algorithms, and artificial neural networks (or, simply, neural networks). The model structure 720 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 720 may include one or more hidden layers of nodes between the input and output layers. The model structure 720 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 722 represent the relationships learned during training and can be used to make predictions and decisions based on input data. The model parameters 722 can weight and bias the nodes and connections of the model structure 720. For instance, when the model structure 720 is a neural network, the model parameters 722 can weight and bias the nodes in each layer of the neural networks, such that the weights determine the strength of the nodes, and the biases determine the thresholds for the activation functions of each node. The model parameters 722, in conjunction with the activation functions of the nodes, determine how input data is transformed into desired outputs. The model parameters 722 can be determined and/or altered during training of the algorithm 716.

The loss function engine 724 can determine a loss function, which is a metric used to evaluate the AI model's performance during training. For instance, the loss function engine 724 can measure the difference between a predicted output of the AI model and the actual output of the AI model and is used to guide optimization of the AI model during training to minimize the loss function. The loss function may be presented via the ML framework 714, such that a user can determine whether to retrain or otherwise alter the algorithm 716 if the loss function is over a threshold. In some instances, the algorithm 716 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 726 adjusts the model parameters 722 to minimize the loss function during training of the algorithm 716. In other words, the optimizer 726 uses the loss function generated by the loss function engine 724 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 726 used may be determined based on the type of model structure 720 and the size of data and the computing resources available in the data layer 702.

The regularization engine 728 executes regularization operations. Regularization is a technique that prevents over- and under-fitting of the AI model. Overfitting occurs when the algorithm 716 is overly complex and too adapted to the training data, which can result in poor performance of the AI model. Underfitting occurs when the algorithm 716 is unable to recognize even basic patterns from the training data such that it cannot perform well on training data or on validation data. The optimizer 726 can apply one or more regularization techniques to fit the algorithm 716 to the training data properly, which helps constraint the resulting AI model and improves its ability for generalized application. Examples of regularization techniques include lasso (L1) regularization, ridge (L2) regularization, and elastic (L1 and L2 regularization).

The application layer 708 describes how the AI system 700 is used to solve problem or perform tasks. In an example implementation, the application layer 708 can be communicatively coupled (e.g., display application data, receive user input, and/or the like) to an interactable user interface of the model diagnostics system 100 of FIG. 1.

Computer System

Figure 8:
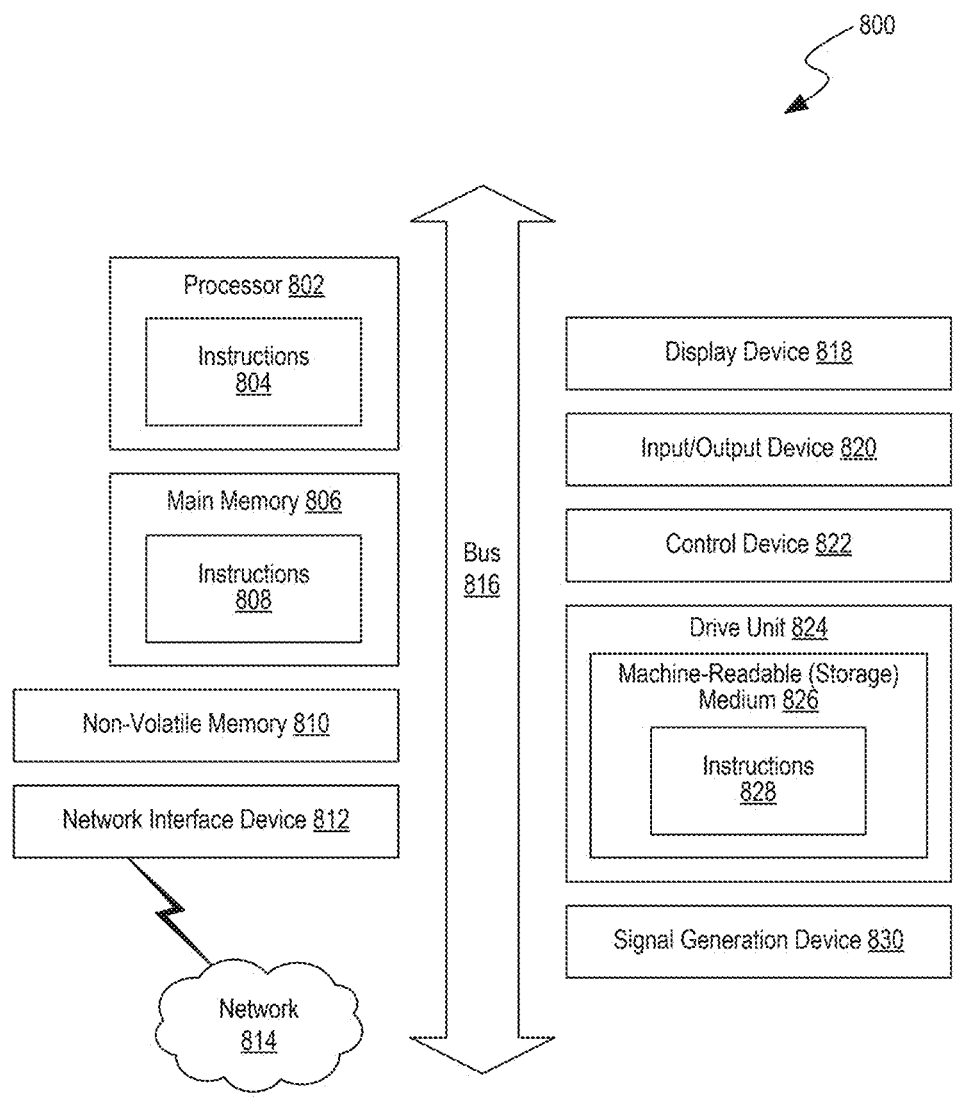
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementations, the computer system 800 can be an embedded computer system, a system-on-chip (SOC), a single-board computer system (SBC), or a distributed system such as a mesh of computer systems, or it can include one or more cloud components in one or more networks. Where appropriate, one or more computer systems 800 can perform operations in real time, in near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A method for automatic discrimination of anomalous signal propagation for runtime services, the method comprising:
   receiving, via an application programming interface (API), a captured sequence of data samples for updating a runtime statistical inference model, each data sample of the captured sequence comprising a set of input features and a corresponding set of output features;
   determining, using a reference position of the captured sequence, a first sample distribution of data samples from the captured sequence of data samples and a second sample distribution of data samples from the captured sequence of data samples,
      wherein the first sample distribution comprises data samples corresponding to a first set of sequence values received prior to the reference position, and
      wherein the second sample distribution comprises data samples corresponding to a second set of sequence values received after the reference position;
   generating, during runtime of the statistical inference model and via comparison of the first and the second sample distributions, a feature divergence score representative of deviations in input feature patterns for data samples between the first and the second sample distributions;
   determining, during runtime of the statistical inference model a set of feature alignment scores representative of similarities or differences between the set of input features and the corresponding set of output features for each of the data samples of the captured sequence;
   selecting, using the set of feature alignment scores, a set of anomalous data samples from the captured sequence of data samples, each anomalous data sample of the set of anomalous data samples corresponding to a feature alignment score that fails to satisfy an alignment threshold;
   responsive to the feature divergence score failing to satisfy a tolerance threshold, identifying a subset of critical input features from the selected set of anomalous data samples,
      wherein each critical input feature is associated with a high correlation between the sets of input features of at least two anomalous data samples from the first or the second sample distributions; and
   transmitting a notification alert indicating maintenance review of the identified subset of critical input features associated with the statistical inference model,
      wherein the notification alert is configured to provide a user interactive element that, when selected, automatically performs an update of the statistical inference model.

2. The method of claim 1 further comprising:
   responsive to user selection for automatically performing the update of the statistical inference model:
      generating, from the captured sequence of data samples, a set of training data samples for refining the statistical inference model, wherein the set of training data samples comprises data samples from the captured sequence that are not present in the set of anomalous data samples, and updating the statistical inference model using the set of training data samples.

3. The method of claim 1, wherein the feature divergence score is a first feature divergence score, and wherein the method further comprises:

determining third and fourth sample distributions of data samples from the captured sequence that are separate from the first and the second sample distributions of data samples;

generating, via comparison of the third and the fourth sample distributions, a second feature divergence score representative of deviations in input feature patterns for data samples between the third and the fourth sample distributions;

responsive to a comparison of the first and the second feature divergence scores failing to satisfy a second tolerance threshold, identifying a second subset of critical input features from the selected set of anomalous data samples, wherein each critical input feature is associated with a high correlation between the sets of input features of at least two anomalous data samples from the third or the fourth sample distributions; and configuring, prior to transmission, the notification alert to indicate required maintenance review of the second identified subset of critical input features associated with the statistical inference model.

4. The method of claim 3, wherein the third sample distribution comprises a quantity of data samples corresponding to a third set of sequence values received prior to the reference position that is lower than a quantity of the data samples of the first sample distribution, and wherein the fourth sample distribution comprises a quantity of data samples corresponding to a fourth set of sequence values received following the reference position that is higher than a quantity of the data samples of the second sample distribution.

5. The method of claim 3, wherein the third sample distribution comprises a first quantity of data samples corresponding to a third set of sequence values received prior to the reference position, wherein the fourth sample distribution comprises a second quantity of data samples corresponding to a fourth set of sequence values received following the reference position, and wherein the first quantity and the second quantity are scaled by an incremental factor of the quantity of the data samples of the first sample distribution and the quantity of the data samples of the second sample distribution, respectively.

6. The method of claim 3, wherein the third sample distribution comprises data samples corresponding to a third set of sequence values received prior to a second reference position of the captured sequence, and wherein the fourth sample distribution comprises data samples corresponding to a fourth set of sequence values received following the second reference position.

7. The method of claim 1 further comprising:

predicting, using a machine learning model, a diagnostic category for characterizing the set of anomalous data samples and the feature divergence score of the first and the second sample distributions, wherein the diagnostic category corresponds to a specific compromised data pattern for the first and the second sample distributions; and configuring, prior to transmission, the notification alert to further provide (1) the predicted diagnostic category, and (2) at least one human-readable narrative that describes a recommended resolution procedure for rectifying the specific compromised data pattern.

8. The method of claim 1 further comprising:

identifying at least one compromised dataset based on a subset of anomalous data samples, wherein each anomalous data sample is assigned to the at least one compromised dataset; and configuring, prior to transmission, the notification alert to display a separate user interactive element that, when selected, automatically navigates to or identifies a stored location of the at least one compromised dataset.

9. The method of claim 1 further comprising:

generating a time-series frequency plot based on the set of anomalous data samples, each data point of the time-series frequency plot comprising:

(1) a time interval range, and (2) a subset of anomalous data samples corresponding to timestamps within the time interval range; and configuring, prior to transmission, the notification alert to display the time-series frequency plot at a graphical interface element that comprises at least one visual marking for distinguishing data points that exceed a frequency tolerance threshold.

10. The method of claim 1 further comprising:

determining, using a reference timestamp, at least one data sample of the captured sequence that corresponds to a timestamp following the reference timestamp; and adding the at least one data sample to the set of anomalous data samples.

11. The method of claim 1 further comprising:

prompting a generative machine learning model to generate a set of approximate semantic correlation weights between the set of input features and the set of output features for the data samples of the captured sequence.

12. One or more non-transitory, computer-readable storage media comprising instructions recorded thereon, wherein the instructions when executed by at least one data processor of a system for automatic discrimination of anomalous signal propagation for runtime services, cause the system to:

receive a captured sequence of data samples for updating a runtime statistical inference model, each data sample of the captured sequence comprising a set of input features and a corresponding set of output features;

determine, using a reference position of the captured sequence, a first sample distribution of data samples from the captured sequence of data samples and a second sample distribution of data samples from the captured sequence of data samples, wherein the first sample distribution comprises data samples corresponding to a first set of sequence values received prior to the reference position, and wherein the second sample distribution comprises a second set of data samples corresponding to sequence values received following the reference position;

generate, during runtime of the statistical inference model and via comparison of the first and the second sample distributions, a feature divergence score representative of deviations in input feature patterns for data samples between the first and the second sample distributions;

determine, during runtime of the statistical inference model, a set of feature alignment scores representative of similarities or differences between the set of input features and the corresponding set of output features for each of the data samples of the captured sequence;

select, using the set of feature alignment scores, a set of anomalous data samples from the captured sequence of data samples, each anomalous data sample of the set of anomalous data samples corresponding to a feature alignment score that fails to satisfy an alignment threshold;

responsive to the feature divergence score failing to satisfy a tolerance threshold, identify a subset of critical input features from the selected set of anomalous data samples,
wherein each critical input feature is associated with high correlation between the sets of input features of at least two anomalous data samples from the first or the second sample distributions; and transmit a notification alert indicating maintenance review of the identified subset of critical input features associated with the statistical inference model,
wherein the notification alert is configured to provide a user interactive element that, when selected, automatically performs an update of the statistical inference model.

13. The one or more non-transitory, computer-readable storage media of claim 12, wherein the feature divergence score is a first feature divergence score, and wherein the instructions further cause the system to:
determine a third and a fourth sample distributions of data samples from the captured sequence that are separate from the first and the second sample distributions of data samples;
generate, via comparison of the third and the fourth sample distributions, a second feature divergence score representative of deviations in input feature patterns for data samples between the third and the fourth sample distributions;
responsive to a comparison of the first and the second feature divergence scores failing to satisfy a second tolerance threshold, identify a second subset of critical input features from the selected set of anomalous data samples,
wherein each critical input feature is associated with a high correlation between the sets of input features of at least two anomalous data samples from the third or the fourth sample distributions; and
configure, prior to transmission, the notification alert to indicate required maintenance review of the second identified subset of critical input features associated with the statistical inference model.

14. The one or more non-transitory, computer-readable storage media of claim 12, wherein the instructions further cause the system to:
predict, using a machine learning model, a diagnostic category for characterizing the set of anomalous data samples and the feature divergence score of the first and the second sample distributions,
wherein the diagnostic category corresponds to a specific compromised data pattern for the first and the second sample distributions; and
configure, prior to transmission, the notification alert to further provide:
(1) the predicted diagnostic category, and
(2) at least one human-readable narrative that describes a recommended resolution procedure for rectifying the specific compromised data pattern.

15. The one or more non-transitory, computer-readable storage media of claim 12, wherein the instructions further cause the system to:
identify at least one compromised dataset based on a subset of anomalous data samples, wherein each anomalous data sample is assigned to the at least one compromised dataset; and
configure, prior to transmission, the notification alert to display a separate user interactive element that, when selected, automatically navigates to or identifies a stored location of the at least one compromised dataset.

16. The one or more non-transitory, computer-readable storage media of claim 12, wherein the instructions further cause the system to:
generate a time-series frequency plot based on the set of anomalous data samples, each data point of the time-series frequency plot comprising:
(1) a time interval range, and
(2) a subset of anomalous data samples corresponding to timestamps within the time interval range; and
configure, prior to transmission, the notification alert to display the time-series frequency plot at a graphical interface element that comprises at least one visual marking for distinguishing data points that exceed a frequency tolerance threshold.

17. A system comprising:
at least one hardware processor; and
at least one non-transitory memory storing instructions, which, when executed by the at least one hardware processor, cause the system to:
receive a captured sequence of data samples for updating a runtime statistical inference model, each data sample of the captured sequence comprising a set of input features and a corresponding set of output features;
determine, using a reference position of the captured sequence, a first sample distribution of data samples from the captured sequence of data samples and a second sample distribution of data samples from the captured sequence of data samples,
wherein the first sample distribution comprises data samples corresponding to a first set of sequence values received prior to the reference position, and
wherein the second sample distribution comprises a second set of data samples corresponding to sequence values received following the reference position;
generate, during runtime of the statistical inference model and via comparison of the first and the second sample distributions, a feature divergence score representative of deviations in input feature patterns for data samples between the first and the second sample distributions;
responsive to the feature divergence score failing to satisfy a tolerance threshold, identify a subset of critical input features from the captured sequence of data samples,
wherein each critical input feature is associated with high correlation between the sets of input features of at least two anomalous data samples from the first or the second sample distributions;

automatically generate a first training dataset comprising positive data samples from the captured sequence that are not included within the set of anomalous data samples and a second training dataset comprising negative data samples based on the identified subset of critical input features;

input the first training dataset of positive data samples and the second training dataset of negative data samples into the statistical inference model to update one or more parameters of the statistical inference model; and transmit a notification alert indicating maintenance review of the identified subset of critical input features associated with the statistical inference model.

18. The system of claim 17 further caused to:

determine a set of feature alignment scores representative of similarities or differences between the set of input features and the corresponding set of output features for each of the data samples of the captured sequence;

select, using the set of feature alignment scores, a set of anomalous data samples from the captured sequence of data samples, each anomalous data sample of the set of anomalous data samples corresponding to a feature alignment score that fails to satisfy an alignment threshold; and determining, from the set of anomalous data samples, the subset of critical input features.

19. The system of claim 17 further caused to:

responsive to user selection for automatically performing the update of the statistical inference model:

generate, from the captured sequence of data samples, a set of training data samples for refining the statistical inference model, wherein the set of training data samples comprises data samples from the captured sequence that are not present in the set of anomalous data samples, and update the statistical inference model using the set of training data samples.

20. The system of claim 17 further caused to:

predict, using a machine learning model, a diagnostic category for characterizing the set of anomalous data samples and the feature divergence score of the first and the second sample distributions, wherein the diagnostic category corresponds to a specific compromised data pattern for the first and the second sample distributions; and configure, prior to transmission, the notification alert to further provide (1) the predicted diagnostic category, and (2) at least one human-readable narrative that describes a recommended resolution procedure for rectifying the specific compromised data pattern.

* * * * *